Patented Nov. 28, 1950

2,531,397

UNITED STATES PATENT OFFICE 2,531,397

SAGGER AND BATCH FOR MAKING THE SAME

Milton W. Caton, East Detroit, Mich., assignor to Champion Spark Plug Company, Toledo, Ohio, a corporation of Delaware No Drawing. Application October 30, 1947, Serial No. 783,219

7 Claims. (Cl. 106—44)

This invention relates to a sagger and to a batch from which a sagger or the like may be made. It has for its object to produce a sagger, or refractory for similar uses, which will be strong enough at high temperatures to sustain a considerable load, and will withstand heat shock sufficiently for use in a fast cycle tunnel kiln where temperatures of from cone 16 to cone 31 are reached.

Minor objects and details of the invention will appear as the description proceeds.

A refractory of alumina and silicon carbide with sufficient clay for molding purposes, in accordance with Patent 2,388,080 issued to Frank H. Riddle, October 30, 1945, Aluminum and Silicon Carbide Refractory, makes a very satisfactory sagger, especially when a proper mineralizer is added and where not subjected to too great heat shock. It has been discovered that the substitution of ground flint, silica sand, or other granular silica for part or all of the silicon carbide increases the resistance to heat shock while still retaining enough strength at high temperatures to serve as a sagger. This is especially true where as pure alumina is used as is obtainable commercially. There is now obtainable alumina sintered at less than its melting point and approximately 99.8% pure, containing less than one-twentieth of one per cent of silica, titania or iron oxide and from .01% to .08% Na₂O. This material has pores readily visible under the microscope and may be ground to any desired fineness, the grains being somewhat rounded. While the size of grain may vary widely, a mixture of 8 mesh and finer is a good general purpose grain for sagger refractory. There is some tendency for the finer grain to have the greater strength and the coarser to be more resistant to heat shock.

For molding purposes, in the neighborhood of 10% of clay is added. Ball clay and the like are favorable to resistance to heat shock, but greater strength at high temperatures may be obtained by 9% diaspore clay and 1% bentonite, which is about equivalent to 10% ball clay for molding purposes.

When granular silica is used with silicon carbide, at least 3% of granular silica is recommented to produce an appreciable increase in resistance to heat shock, and the granular silica and carbide together should be from 11% to 20% for best results. Somewhat over 20% of the carbide may be used without serious decrease in strength, but with increased danger of staining the ware.

When granular silica is used without carbide, the strength at cone 16 may have a peak at about 14% approximating the strength with a similar amount of carbide, or there may be a substantially constant strength from 6% to 16% approximately ½ that of the 15% carbide mix, this apparently depending upon the form and purity of the silica grain. Therefore, at least 6% of the granular silica should be used where no carbide is present, and 12% to 16% gives the best results, all things considered for the granular silica alone or the granular silica and carbide mixture.

While for some purposes granular silica may be used without any carbide in a range of from 6% to 20% and may be employed from 3% to 20% with the carbide, the preferred range is from 3% to 16% of the granular silica with enough carbide to bring the two together to 11% to 16%. A very generally satisfactory sagger may be made with about seven per cent each of granular silica and silicon carbide.

The strength of the fired refractory at high temperatures is markedly increased by the proper amount of mineralizer. The recommended mineralizers are sodium aluminate and calcium aluminate. It requires as much as ½% of either of these to show noticeable improvement, and over 2½% is detrimental. The preferrend range is from 1% to 2%, and 1% of sodium aluminate or 2% calcium aluminate is recommended.

The mixture of about 10% clay, 1% or 2% of aluminate of sodium or calcium, 3% to 20% granular silica and 0 to 17% silicon carbide with the balance of commercially pure alumina, may be moistened, tamped into a mold and fired. Not only does the mixture, when fired, produce a sagger which is strong at high temperatures and resistant to heat shock, but also the shrinkage during firing to cone 16 is exceedingly small, and change in size by subsequent firing is also exceedingly small. While the invention is directly concerned with saggers and a batch that will make a good sagger, it will be understood that the batch may be made into other articles where its peculiar properties will be useful.

What I claim is:

1. A sagger having high strength at high temperatures and a high resistance to heat shock and consisting of a fired mixture of approximately 10% clay to facilitate molding, ½% to 2½% of a mineralizer of the class consisting of sodium aluminate and calcium aluminate, from 3% to 20% granular silica, up to 17% silicon carbide, the granular silica and carbide together constituting at least 6% and not over 20%, and the remainder of commercially pure alumina.

2. A sagger in accordance with claim 1 and which is made from a mixture containing approximately 7% each of granular silica and silicon carbide.

3. A ceramic batch for making refractories such as saggers which consists of approximately 10% clay to facilitate molding, 3% to 20% granular silica, up to 17% silicon carbide, ½% to 2½% of a mineralizer of the group consisting of sodium aluminate and calcium aluminate, and the balance of commercially pure alumina.

4. A batch in accordance with claim 3 and in which the granular silica and silicon carbide together constitute 11% to 16%.

5. A batch in accordance with claim 3 and in which the clay is approximately 9% diaspore clay and 1% bentonite.

6. A batch for making refractories such as saggers and which consists of approximately 9% diaspore clay, 1% bentonite, 1% to 2% of a mineralizer of the group consisting of sodium aluminate and calcium aluminate, 3% to 16% granular silica, up to 13% silicon carbide with the granular silica and carbide together constituting 11% to 16%, and the balance of commercially pure alumina.

7. A batch in accordance with claim 6 and in which there is approximately 7% each of granular silica and silicon carbide.

MILTON W. CATON.

REFERENCES CITED

The following references are of record in the file of this patent:

UNITED STATES PATENTS

| Number | Name | Date |
|---|---|---|
| 2,246,226 | Walton | June 17, 1941 |
| 2,388,080 | Riddle | Oct. 30, 1945 |
| 2,416,700 | Kocher | Mar. 4, 1947 |